United States Patent [19]

Robertson

[11] Patent Number: 5,536,135
[45] Date of Patent: Jul. 16, 1996

[54] MATERIAL TRANSFER APPARATUS

[75] Inventor: Gary D. Robertson, Jonesborough, Tenn.

[73] Assignee: Valley Equipment Company, Jonesborough, Tenn.

[21] Appl. No.: 423,820

[22] Filed: Apr. 19, 1995

[51] Int. Cl.⁶ .................................. B66F 19/00
[52] U.S. Cl. .................. 414/728; 414/737; 414/917; 901/15
[58] Field of Search .............................. 414/744.2, 744.5, 414/917, 728, 729, 733, 737; 901/15, 22; 74/490.01

[56] References Cited

U.S. PATENT DOCUMENTS

| 2,500,815 | 3/1950 | Gerli et al. | 414/917 X |
|---|---|---|---|
| 3,168,184 | 2/1965 | Galvin | 414/744.8 X |
| 3,255,893 | 6/1966 | Hainer et al. | 414/728 |
| 3,703,968 | 11/1972 | Uhrich et al. | 414/917 X |
| 3,952,890 | 4/1976 | Armstrong | 414/917 X |
| 4,054,185 | 10/1977 | Stedman | 414/917 X |
| 4,175,899 | 11/1979 | Tipton | 414/917 X |
| 4,345,871 | 8/1982 | Kalif | 414/917 X |
| 4,451,196 | 5/1984 | Harada et al. | 414/917 X |
| 4,548,544 | 10/1985 | Van Appledorn | 901/22 X |
| 4,589,819 | 5/1986 | Shirao | 414/917 X |
| 4,975,016 | 12/1990 | Pellenc et al. | 414/917 X |
| 5,257,998 | 11/1993 | Ota et al. | 414/917 X |
| 5,441,505 | 8/1995 | Nakamura | 414/917 X |

FOREIGN PATENT DOCUMENTS 128900   5/1991   Japan ........................ 414/917

*Primary Examiner*—David A. Bucci
*Attorney, Agent, or Firm*—Luedeka, Neely & Graham

[57] ABSTRACT

A pivoting linkage mechanism provides a linear translational path for a tool holder over a predetermined displacement distance. A single linear motor drives the tool carrying end of the mechanism within a displacement plane defined by collective rotation of two sets of parallel, four-bar linkages joined by a transfer plate. A control link between a frame secured axis and an axis mid-span of a swinging linkage set further restricts pivotal displacement of the entire assembly. The translating tool holder supports a journal socket for the pivot axis of a third four-bar, parallel linkage for controllably swinging a secured article in a horizontal plane between opposite sides of the transfer apparatus.

7 Claims, 4 Drawing Sheets

MATERIAL TRANSFER APPARATUS

BACKGROUND OF THE INVENTION

The present invention relates to tool or material positionment machines with precision motion control as may be used by industrial robots, material processors and transfer facilities. There are numerous industrial tasks that require a tool or workpiece to be translated from one position to another along a prescribed path. Definitively, translation is a positional change of spacial coordinates without rotation. Most restrictively, such industrial process translation is required to be in a substantially straight line or constant plane.

U.S. Pat. No. 5,222,854 issued Jun. 29, 1993 to L. D. Blatt et al is typical of numerous prior art translational mechanisms. In this example, the objective is to remove a sheet metal stamping from the platen of a first press, translate the stamping to a conveyor carried support cradle which delivers the stamping to a second press where a second transfer machine removes the stamping from the conveyor cradle and positions it upon the second press platen. The Blatt et al transfer machine pick up tool is supported by a four bar parallelogram linkage wherein the parallel links, which support the tool carrier in a level plane at their lower end, are pivotally secured at their opposite end to a vertically adjustable pivot mount and also pivotally secured at the respective mid-spans to a horizontally adjustable pivot mount. Both pivot mount adjustments are motor driven and controlled by programmable microprocessors for simultaneous pivot position changes to translate the workpiece over the desired, straight line path.

U.S. Pat. No. 4,589,819 issued May 20, 1986 to S. Shirao also provides a sheet metal work piece handling machine for loading and unloading presses. Shirao also pivotally connects his tool holder to the lower end of a four bar parallelogram linkage. The upper ends of that linkage are pivotally secured to a position adjustable pivot mount which is vertically translated by a strut motor. The tool holder is laterally translated in a horizontal plane by a strut driven crank arm having one end pivotally connected to one of the parallel links.

U.S. Pat. No. 4,451,196 issued May 29, 1984 to Yutaka Harada describes another transfer mechanism having two, four bar linkages compounded end-to-end wherein the distal ends of one linkage pair are pivotally connected to the distal ends of the other linkage pair. However, one of the pivotal connections includes a plate cam and follower arrangement which provides a variable length to the link that is common to the two linkage pairs. The invention objective is to provide a constant translational plane for the tool holder.

U.S. Pat. No. 3,168,184 issued Feb. 2, 1965 to S. N. Gavin is directed to an apparatus for orthogonally translating glass sheets from one conveyor to another. A control parameter for the Gavin apparatus is that the sheets travel in a "uniform parallel plane in order to avoid the induction of any turbulent flow which may cause cracking of the glass sheets." To accomplish the objective, the glass plate pick-up tool is positioned at the end of a vertical axis hydraulic cylinder. The cylinder is carried at the outboard end of a four bar parallelogram linkage disposed exclusively for horizontal swinging movement. Vertical movements of the glass sheet are controlled linerally by the fluid strut.

It is an objective of the present invention, therefore, to provide a four bar, parallelogram linkage assembly for translation of an arm end mounted tool along a line substantially perpendicular to the assembly base, such translational movement respective to a single plane being powered by a single motor alignment.

Another object of the present invention is to provide a horizontally swinging, plate material transfer boom that may be raised and lowered along linear vertical paths by a single linear strut motor.

A still further object of the present invention is to provide a linear displacement distance of reasonable length by a compounded organization of pivotal links.

SUMMARY OF THE INVENTION

These and other objects of the invention to subsequently become apparent are accomplished by the material transfer apparatus of the present invention which supports a tool mounting joint at the outer end of an articulated arm having two four-bar parallelogram linkage sections joined end-to-end by a pivot plate. The tool mount is to be displaced linearly along a line by a prescribed distance which is substantially perpendicular to a base plane that secures a pair of parallel base link pivot axes. A pair of transversely rigid base links possibly comprising four, substantially equal length links are pivotally secured to the two base axes and project parallel therefrom.

At their swing ends distal from the base axes, the base links are pivotally secured at first and second pivot axes to a transfer plate which may also be represented by a pair of transversely separated, parallel transfer plates. The transfer plate also includes a third pivot axis triangularly displaced from the other two axes.

A second pair of four bar, parallel links have their base ends pivotally secured to the first and third transfer plate axes. From the transfer plate axes the second parallel link set includes an elongated reach terminated by pivot axis attachment to a tool mounting element.

Intermediate of its length between the first transfer plate axis and the tool mount axis, the respective short link set is pivotally tethered to the machine base by a short pivot link between the second four bar link and the machine base frame.

A fluid power strut may be connected between the machine base frame near the first base axis and the second link set near the short link pivot axis to drive displacement of the apparatus tool-end.

A cantilevered, swinging beam may be secured for rotation about an axis through the tool mount that remains perpendicular to the base plane. The other end of the swinging beam carries a tool fixture suspended by a spindle for rotation about an axis perpendicular to the base plane. A parallel follower link pivotally connected between the tool mount and the tool fixture presents the fixture from rotating as it is translated across the operating plane of the first two parallel linkage sets.

BRIEF DESCRIPTION OF THE DRAWINGS

The foregoing apparatus is more fully described with reference to the attached drawings in which like reference characters designate like or similar elements throughout the several figures of the drawings and wherein.

DETAILED DESCRIPTION OF THE INVENTION

Figure 1:
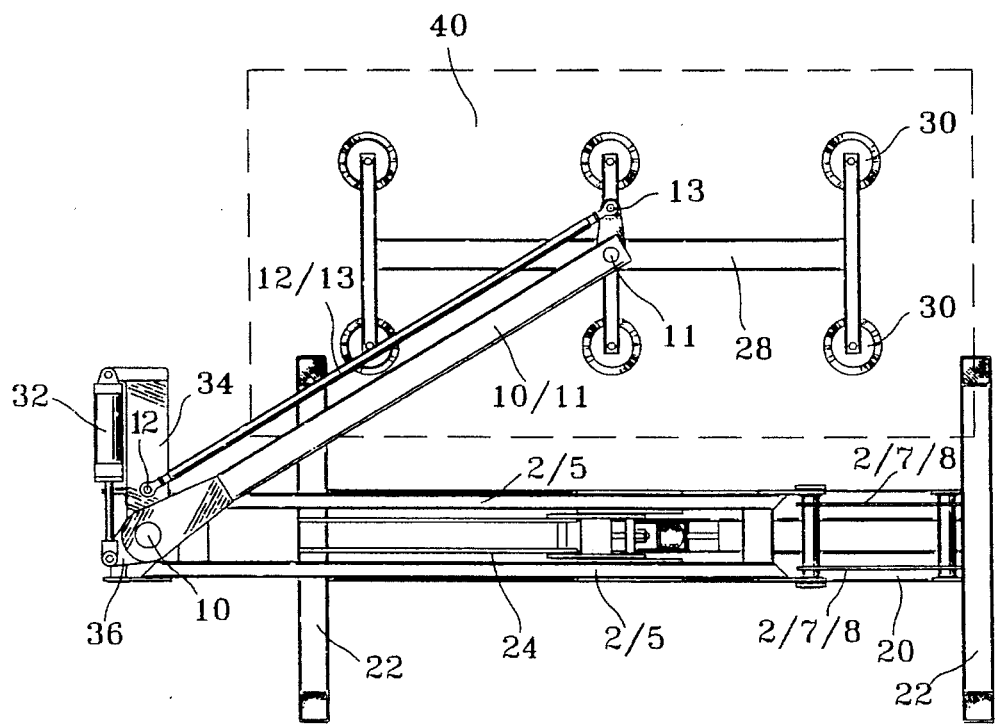
FIG. 1 is a plan view of the invention.
Figure 2:
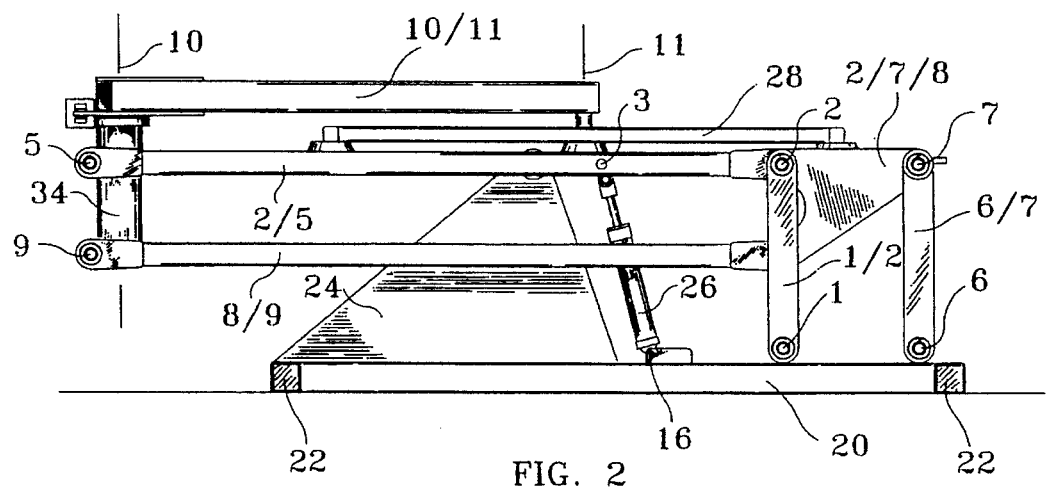
FIG. 2 is an elevational view of the invention at an operational mid-position.
Figure 3:
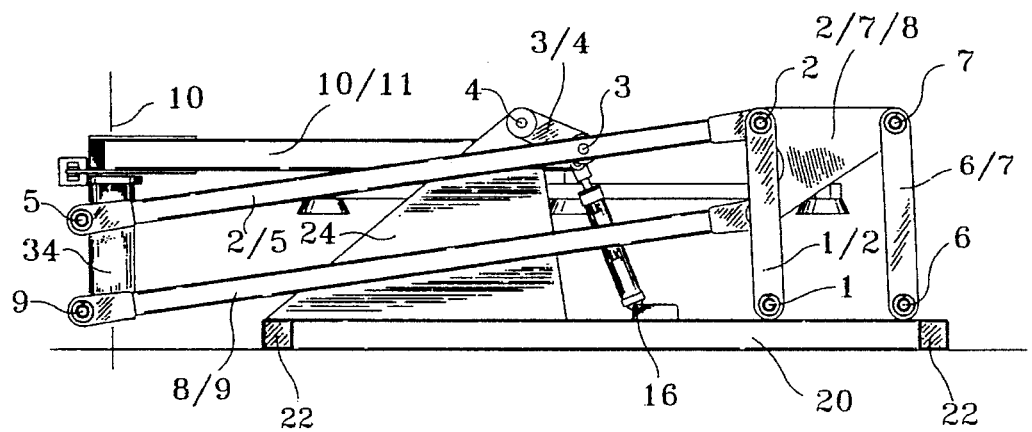
FIG. 3 is an elevational view of the invention at one operational extreme position.

A preferred embodiment of the invention will now be described by reference to FIGS. 1 through 4 of the drawings wherein a frame base 20 is stabilized at respective ends by perpendicular outriggers 22. A pedestal 24 rigidly secured to the frame base 20 provides a relatively fixed position for a link pivot journal and axis 4 (FIG. 3).

Journal axes 1 and 6 are also rigidly secured to the frame 20 in parallel alignment with each other and the support plane for the frame base 20.

From the journals 1 and 6, an inner arm comprising equal length links 1/2 and 6/7 connects a parallel elbow plate 278 by journal axes 2 and 7. More expansively, the inner arm portion of the illustrated embodiment of the invention has two each of links 1/2 and 6/7. A link set comprising a first link 1/2 swinging in substantially the same plane as a second link 6/7 represents, with the corresponding structure of the frame 20 and transfer plate 2/7/8, a four bar parallelogram linkage positioned on one of two opposite side planes of the frame pedestal 24. This arrangement of laterally matched pairs of linkage sets tied together coaxially at such pivot axis by rigid spacer sleeves provides symmetrical force balance on opposite sides of the frame pedestal 24.

The elbow plates 2/7/8 may be of any appropriate profile to include a third journal axis 8 at a substantially right angle relationship from the base link swing axis 2 and the line connecting the axis 2 with the swing axis 7.

Outer arms 2/5 and 8/9 are aligned from opposite end axes 2 and 5 and 8 and 9, respectively, as four bar parallelogram links wherein both arms 2/5 and 8/9 are substantially the same length between the end journal axes. Additionally, the respective pairs of journal axes 2 and 8 and 5 and 9 are substantially equidistantly spaced whereby both link pairs 2/5 and 8/9 or 2/8 and 5/9 are always parallel with each other regardless of the angular relationships with other components.

Figure 4:
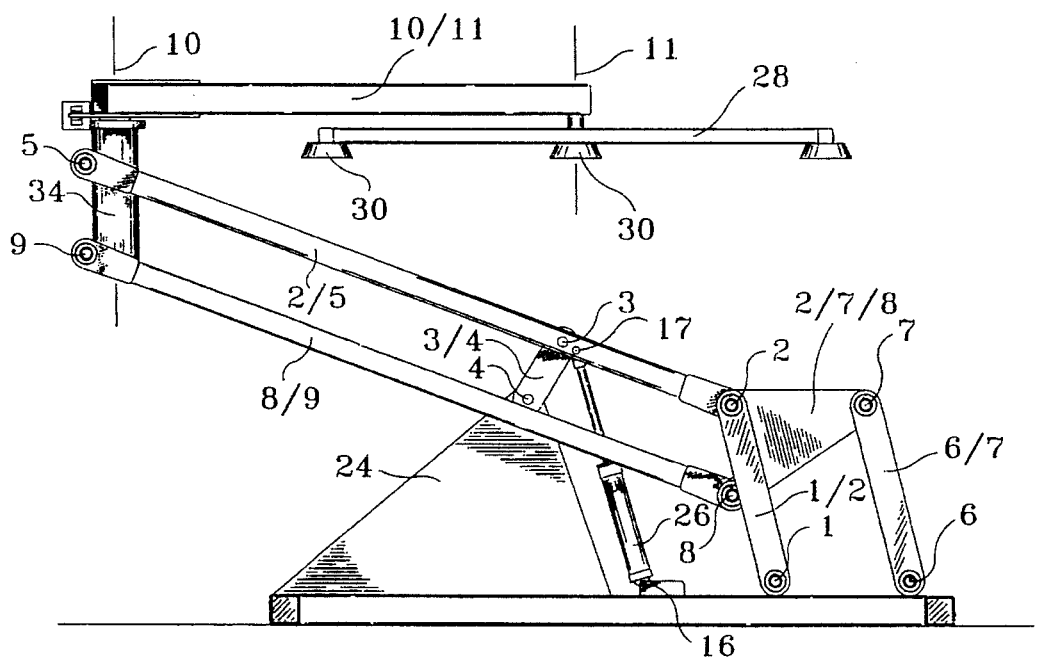
FIG. 4 is an elevational view of the invention at the opposite operational extreme position.
Figure 9:
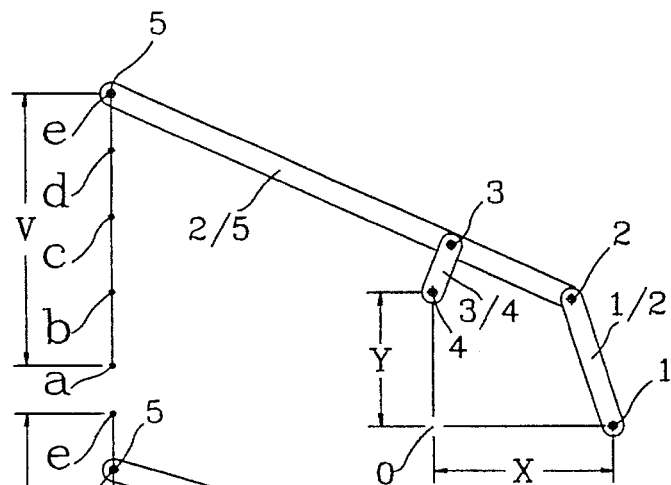
FIGS. 5 through 9 are schematic elevations of the invention at progressive positions from one operational extreme to the other; and, FIG. 10 is an enlarged schematic of the invention illustrating the tool carrier path of the invention beyond one linear limit.
Figure 8:
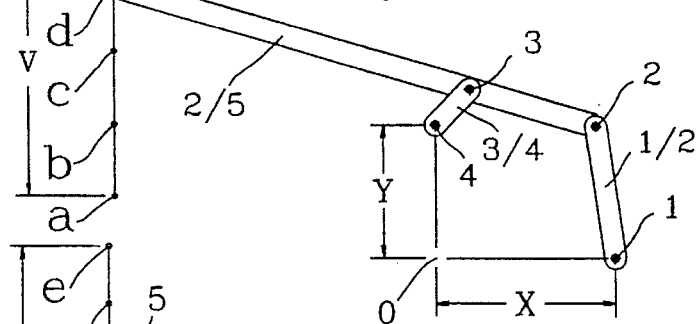
Figure 7:
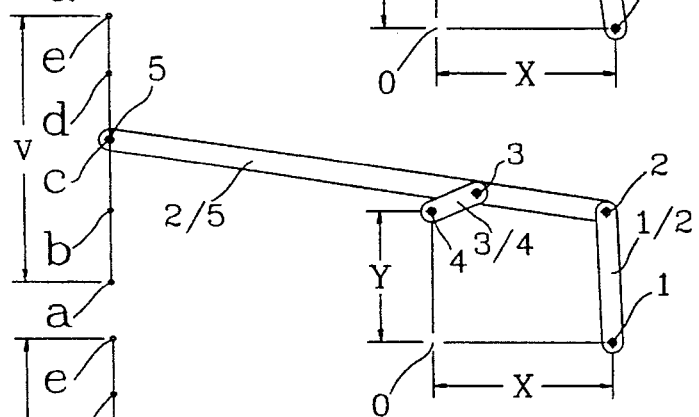
Figure 6:
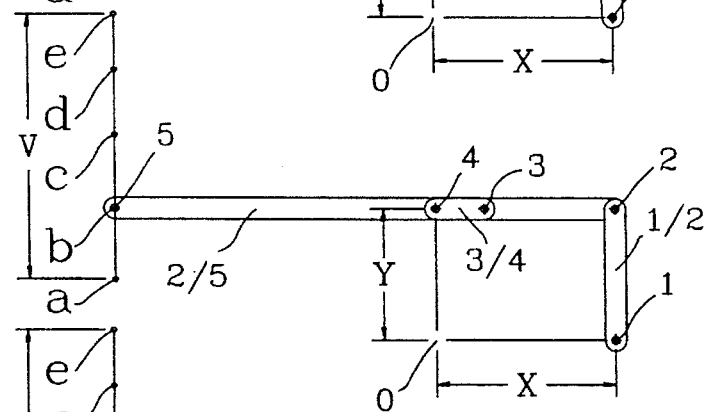
Figure 5:
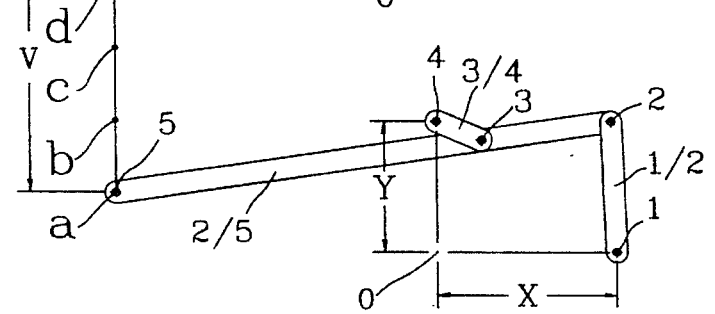

Relative to FIGS. 3 and 4, the linkage assembly of the invention is stabilized about the several axes by a lift link 3/4 between the lift arm axis 3 and the frame of 54. As before, lift links 3/4 may be fabricated in parallel pairs respective to opposite faces of the pedestal 24.

At the distal ends of the outer arms 2/5 and 8/9, the journal axes 5 and 9 are rigidly secured with the tool mount 34 which supports the journal axis 10. When constructed approximately to the scale of the following dimensions tabulated by Data Table I, the journal axis 10 through tool mount 34 will deviate less than 0.0625 units over a 48 unit course from the position limit of FIG. 3 to the position limit of FIG. 4. Relative to the base plane of frame 20, the translational source of tool mount 34 is approximately perpendicular to the base plane.

| Data Table I | | | | | | | | | | | |
|---|---|---|---|---|---|---|---|---|---|---|---|
| Link | 0/1 | 4/1 | 1/2 | 2/3 | 2/5 | 3/4 | 6/7 | 8/9 | V | X | Y |
| Dimension | 33 | 24.0625 | 24 | 24 | 92 | 9 | 24 | 92 | 48 | 33 | 24.0625 |

In the preferred configuration of an elbow plate 278, the tool mount 34 supports a beam 10/11 swinging about the journal axis 10. A tool frame 28 suspended from the axis 11 swing end of the beam 10/11 is equipped with load attachment vacuum cups 30 which secure a plate shaped load 40 such as glass or sheet metal stock.

Other embodiments of the invention may include other types of lifting, holding or attachment devices such as magnets, hooks, grapples or clamps.

Beam 10/11 is controllably rotated about axis 10 by an appropriate drive mechanism such as a fluid motor 32 connected between a structural extension of the tool mount 34 and a crank arm extension 36 of the beam 10/11. Other suitable drives, for example, may include a mechanical linear actuator or a rotary actuator operative directly upon a spindle axis 10. Any of these alternative drive mechanisms may be driven by fluid, electricity, human or animal manipulation or by wind energy. Although the beam 10/11 rotates about axis 10, panel 40 is sustained at a fixed angular altitude parallel with the base plane of frame 20 by the follower bar 12/13 between pivot axes 12 and 13. Pivot axis 12 is secured to a structural extension of the beam journal 34 whereas pivot axis 13 is secured to a rigid structural element of the tool frame 28.

Translational movement of the tool mount 34 parallel with the axis 10 is driven by the linear motor 26 secured between the frame axis 16 and a rod axis 17 on the outer arm 2/5. Although the linear motor 26 is illustrated as a fluidized device such as a hydraulic piston/cylinder, it will be appreciated that a motor driven lead screw may also be used. Note also that the rod axis 17 is not necessarily co-incident with the lift link swing axis 3, although coincidence is not excluded. In fact, the force of linear motor 26 may be successfully applied at several locations along the lift linkage that includes the outer arm 2/5.

Those of ordinary skill in the art will recognize that the function of linear motor 26 may be served equally well in some applications by driving the lift link 3 with direct torque about the axis 4. Such direct torque may be applied by human or other animal power as well as fluid and electrical power.

Figure 10:
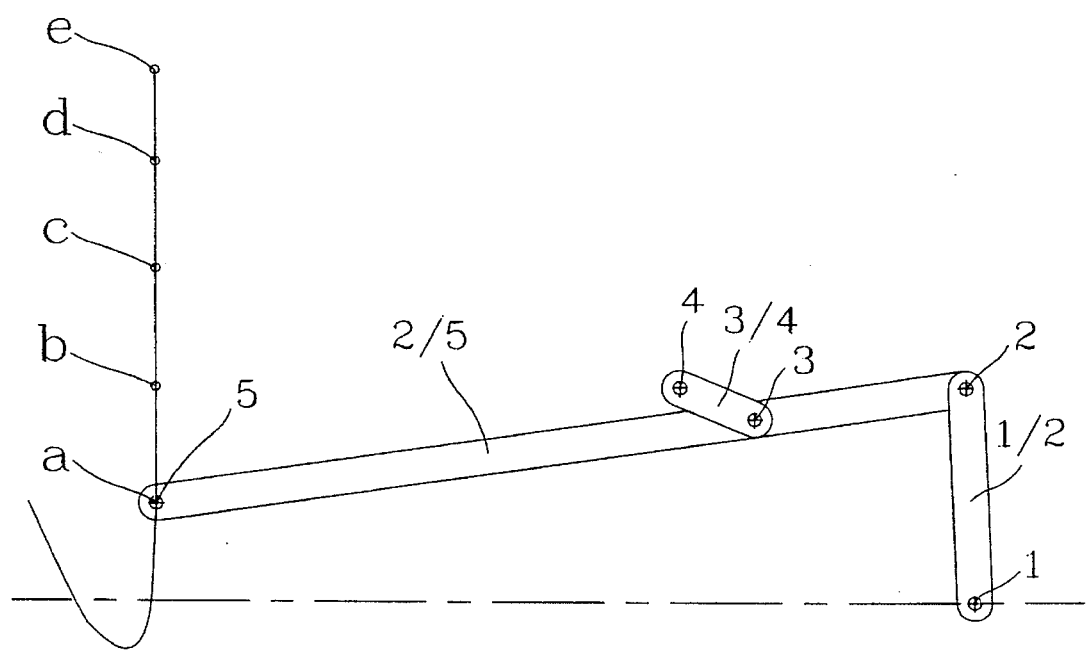

FIGS. 5 through 9 illustrate five stations, a through e, of a positional progression sequence for a single link model of the present invention over a V unit displacement of the lift arm swing axis 5. FIG. 10 is an enlarged illustration of the FIG. 5 linkage position having a superimposed projection of the axis 5 path when clockwise rotation of the lift link 3/4 about the frame axis 4 is continued for about another 150°.

Although a particularly preferred embodiment of the present invention has been described in the foregoing detailed description, it will be understood that the invention is capable of numerous rearrangements, modifications and substitutions without departing from the scope and spirit of the invention as set forth in the following claims. For Example, another application environment for the invention could include a wing or test article support arm for a wind tunnel or hydrodynamic channel. Another application example could include a linear bearing support for a wood working tool such as a saw or router. An extremely useful and appropriate application might also be a machine thread tapping guide.

As my invention, therefore, I claim:

1. A material transfer apparatus for moving a tool mount along a line that is substantially straight and substantially perpendicular to a base plane, said apparatus comprising a first four-bar parallelogram linkage that is pivotable at one end thereof about a pair of axes that are secured by a base frame substantially parallel to said base plane, said first linkage being pivotable at another end thereof about substantially parallel first and second swing axes, said swing axes being positionally separated by a substantially fixed dimension on a supported swing element, a second four-bar parallelogram linkage having one end pivotable about a pair of axes that are substantially parallel with said swing axes, one of said second linkage axes being coincident with said first swing axis and the other of said pair of second linkage pivot axes being a third swing axis positionally secured on said swing element at a triangulated location relative to said first and second swing axes, another end of said second linkage supporting a tool mounting element by a pair of substantially parallel tool mount axes, said tool mounting element supporting a tool rotational axis coincident with said displacement path and substantially perpendicular to said tool mount axes and an arc control link having one end pivotally secured to said base frame about an axis substantially parallel to said first linkage axes and another end pivotally secured to said second linkage at a point intermediate of said second linkage ends about an axis substantially parallel to said second linkage end axes whereby said tool mounting element will traverse a substantially straight line over at least a portion of a displacement path resulting from a partial rotation of said control link about its respective base frame axis.

2. A material transfer apparatus as described by claim 1 having a third four-bar parallelogram linkage with a first pair of pivot axes at one end of said third linkage secured to said tool mounting element and a second pair of pivot axes at another end of said third linkage secured to an article holding structure whereby said holding structure may be displaced from one side of said base frame to another side without rotation relative to said base frame.

3. A material transfer apparatus as described by claim 2 wherein a first axis of said first pair of third linkage pivot axes is coincident with said displacement path and supports a crankarm portion of a third linkage beam bar, said crankarm being rotatively displaced about said tool rotational axis by power means secured to said tool mounting element.

4. A material transfer apparatus as described by claim 3 having the second axis of said first pair of third linkage pivot axes positionally secured to said tool mounting element, one end of said third linkage including a follower bar having one end pivotally secured at said second axis of said first pair of third linkage pivot axes.

5. A material handling apparatus for translating an article from one side of said apparatus to another side comprising a first four-bar parallelogram linkage having parallel fixed base axes and first and second swing axes, said swing axes secured by an integral transfer element at a fixed separation distance therebetween, a second four-bar parallelogram linkage having first and second parallel pivot axes at one end fixed in said integral transfer element, said first axis of said first linkage being coaxial with said first axis of said second linkage and second axes respective to said first and second linkage being secured at substantially right angle positions in said transfer element relative to said coaxial first axes, third and fourth axes respective to an opposite end of said second linkage being secured to a pivot element having a fifth pivot axis substantially normal to said third and fourth axes, a control linkage pivotally secured at one end to said second linkage and pivotally secured at an opposite and to said fixed base, a first motor for rotating said first and second control linkages about respective pivot axes and a third four-bar parallelogram linkage having first and second pivot axes respective to each of opposite ends thereof, said first pivot axis of one end of said third linkage being coaxial with said pivot element fifth axis and said first pivot axis of the opposite end of said third linkage being coaxial with a pivoting joint respective to an article attachment appliance.

6. A material handling apparatus as described by claim 5 wherein said first pivot axes respective to the opposite ends of said third linkage are structurally joined by a first bar element and said second pivot axes respective to opposite ends of said third linkage are structurally joined by a second bar element that is substantially parallel with said first bar element.

7. A material handling apparatus as described by claim 6 wherein said first bar element comprises a crankarm portion attached to power means for rotating said third linkage about said pivot element fifth pivot axis.

* * * * *